United States Patent [19]

Wilwerding

[11] Patent Number: 5,539,679
[45] Date of Patent: Jul. 23, 1996

[54] LINEARIZATION SCHEME FOR OPTICAL MEASUREMENT SYSTEMS

[75] Inventor: Dennis J. Wilwerding, Littleton, Colo.

[73] Assignee: Honeywell Inc., Minneapolis, Minn.

[21] Appl. No.: 677,312

[22] Filed: Mar. 29, 1991

Related U.S. Application Data

[63] Continuation-in-part of Ser. No. 199,882, May 27, 1988, abandoned.

[51] Int. Cl.$^6$ .................................................. G01J 1/20
[52] U.S. Cl. ................ 364/571.02; 364/525; 354/402
[58] Field of Search .......................... 364/573, 571.01, 364/571.02, 525; 354/402, 410

[56] References Cited

U.S. PATENT DOCUMENTS

| | | | |
|---|---|---|---|
| 4,333,007 | 6/1982 | Langlais et al. | 354/402 |
| 4,400,731 | 8/1983 | Brown | 358/139 |
| 4,446,715 | 5/1984 | Bailey | 364/571.02 |
| 4,670,659 | 6/1987 | Loose | 364/571 |
| 4,692,884 | 9/1987 | Pryor | 364/573 |
| 4,803,509 | 2/1989 | Nakai et al. | 354/410 |
| 5,047,968 | 9/1991 | Carrington et al. | 364/574 |

*Primary Examiner*—Vincent N. Trans
*Attorney, Agent, or Firm*—Charles J. Ungemach

[57] ABSTRACT

A method and apparatus for correcting errors in an optical measurement system utilizing a lens which may have distortions that would vary as a function of distance, by providing an encoded indication of the distortions of the lens for use by the system operator together with distance information to input a microprocessor and modify the signal from the detectors in the system to produce an accurate output.

21 Claims, 1 Drawing Sheet

LINEARIZATION SCHEME FOR OPTICAL MEASUREMENT SYSTEMS

This application is a continuation-in-part application of my application Ser. No. 07/199,882 filed May 27, 1988 entitled LINEARIZATION SCHEME FOR OPTICAL MEASUREMENT SYSTEM, now abandoned.

BACKGROUND OF THE INVENTION

The present invention relates to optical measurement systems and more particularly to a method and apparatus for correcting errors in an output signal of a detector array caused by distortions which exist in the lens or lens system which conducts radiation to the detector array.

In most lenses, particularly those comprised of a series of individual lenses so arranged as to provide a desired characterized output, certain unavoidable distortion errors are found. "Distortion" as used herein means the variation in magnification with different distances off axis. That is, as the object varies in position from the optical axis, the image position varies in a non-linear manner. Manufacturers of lenses are able make lenses which have an exact desired magnification along the optic axis, for example, but as the magnification is checked at points more remote from the optic axis, slight differences from the desired magnification are almost always found. These distortions are for the most part symmetrical about the optic axis and are found to follow a curve which is substantially the same for all lenses of a particular design, but the distortions from one design to another vary. The equation for the curve representing the distortion is derivable from an examination of the lenses and the differences from one type of lens to another can also be found. In the prior art, however, the user of the lens in, for example a measurement system, has not known the distortion values and has not been able to correct the errors particularly when the lenses he uses must be interchangeable from one type to another type requiring different corrections. I have also discovered that the distortion of the lens effects the measurement system in slightly different but significant ways for varying distances to the object being detected. Since the distortions vary with distance, distortion compensation based on a reference distance will be incorrect for other distances which may include the actual target distances. These distance dependent variations limit the achievable system measurement accuracy. Also I have found that there are certain inherent errors usually found in the measurement system or the camera which observes the object. Such errors, as for example, the non-centering of the detector array in the image of the object can introduce further distortions in the final output.

BRIEF DESCRIPTION OF THE PRESENT INVENTION

In accordance with the present invention, the lens manufacturer, for example, would encode the variable values representing the lens distortions, in one embodiment, on the lens body itself. The user then having a detection system which utilizes the lens, can feed the encoded values into his detecting system and the values would be used to correct the erroneous signals obtained from the detectors because of the lens distortion. In another embodiment the user would employ a computer which receives an input from, for example, a floppy disk provided by the manufacturer which would have the values encoded thereon. The computer would then provide an output to correct for the lens distortion. A second input may be supplied from a device which produces a signal variable with the distance to the remote object so that the system can compensation for the varying distances. The computer or a microprocessor connected to the measurement system or camera may also be used to correct for any inherent system or camera positioning errors.

SUMMARY OF THE INVENTION

DETAILED DESCRIPTION OF THE PREFERRED EMBODIMENTS

Figure 1:
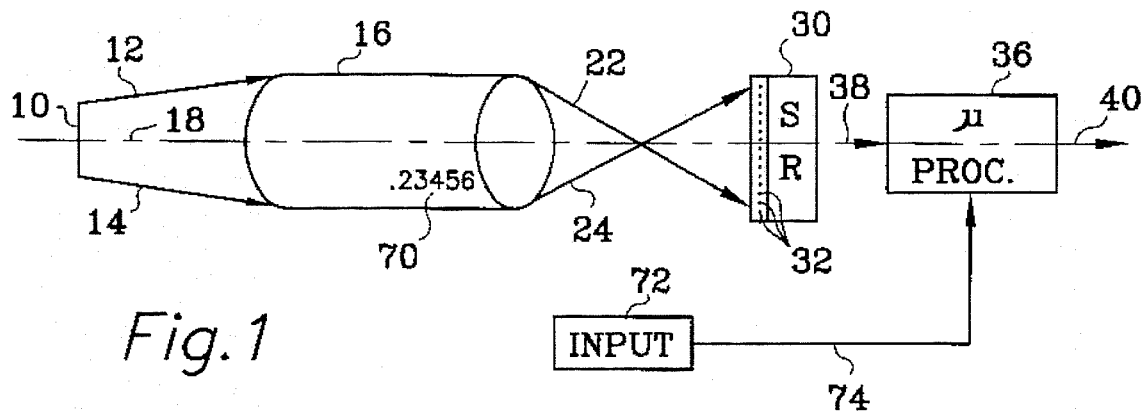
FIG. 1 is a schematic representation of the present invention.

FIG. 1 shows an optical system for use in producing an output indicative of the size of a remote object. Such a system is one example where lens distortions can produce significant errors. The present invention can, of course, be used in a variety of other applications. In FIG. 1, the remote object is shown as a vertical member 10, radiation from which is directed along lines such as arrows 12 and 14 towards a lens 16 having an optic axis 18. Lens 16 operates to produce an image 20 of the object 10 along lines such as shown by arrows 22 and 24. Image 20 is shown being projected onto a detector array 30 which includes a plurality of individual detector elements, for example, CCD detectors shown by dots 32.

The purpose of the apparatus of FIG. 1 is to determine the size of object 10 to within very close tolerances and accordingly, the output of detectors 32 is fed through a shift register 34 so as to produce a serial output to a microprocessor or computer 36 along a connection shown as arrow 38. Microprocessor 36 is programmed to detect abrupt changes in signal output from the individual detectors 32 and from the abrupt changes to determine the edges of object 10. By knowing where the edges of object 10 are located, the size of the object may be calculated by the microprocessor in well known fashion so as to produce an signal indicative of this size on an output shown by arrow 40.

Unfortunately, lens 16 necessarily includes distortions which occur in the manufacture of the lens and particularly those consisting of a plurality of individual lenses. This occurs primarily because each lens design is a compromise to achieve a number of desired characteristics and may typically attempt to reduce several aberration concurrently. Accordingly, although the manufacturer can make the lens substantially perfectly accurate along the optic axis, at distances more remote from the optic axis, the distortions can produce different magnifications so that the outputs of the detectors representative of the size of image 20 may not accurately represent the actual size of the object 10. Furthermore, it is very difficult to produce a lens which has no distortion at other than the designed focal distance.

It has been found that all lenses manufactured of the same design will have a variation in output which changes with distance from the optic axis along a curve that is similar for all lenses of that design. However, when utilizing interchangeable lenses, a lens of a different design utilized in the system of FIG. 1 may have different distortions.

Figure 2:
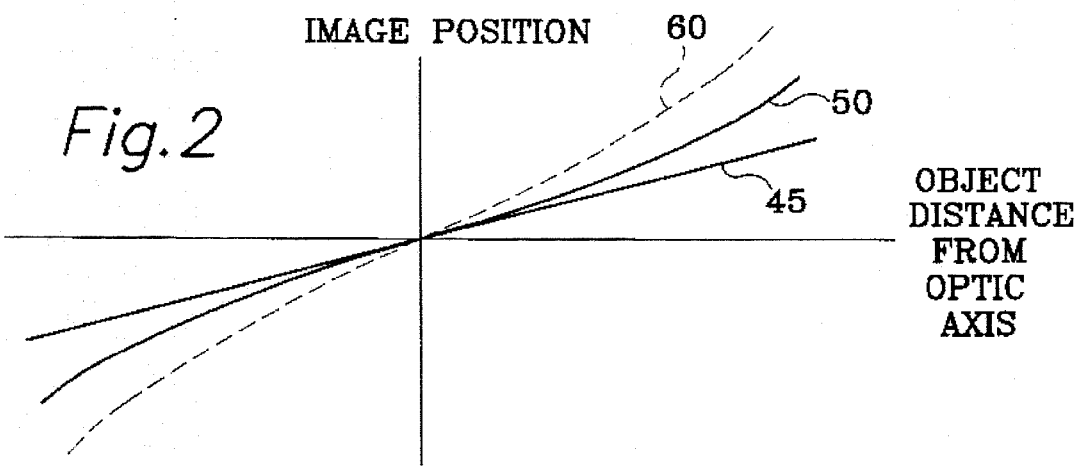
FIG. 2 shows a curve representing a presumed distortion curve for a type of lens.

In FIG. 2 the solid line linear curve 45 represents the image position verses object distance from the optic axis for a theoretically perfect lens (i.e. the magnification in constant. The solid lines curve 50 represents the image position verse object distance with a first lens design and dash line 60 represents the image verse object distance for a second lens design. It is seen that curve 50 is substantially without any magnification error near the optic axis, but as the distance from the optic axis changes in a first direction, or to the right in FIG. 2, a magnification error appears and increases as the distance from the optic axis continues to increase. It is also seen that curve 50 is substantially symmetrical so that, with distances from the optic axis in the other direction, or to the left in FIG. 2, the magnification error similarly increases as the distance from the optic axis continues to increases.

If an alternate lens were used instead of lens 16 in the system of FIG. 1, the curve may have the same general shape as curve 50 but different magnification error as shown in FIG. 2 by dash line 60. Again at the optic axis there would be substantially no magnification error. However, with the alternate lens, curve 60 is seen to produce a magnification error of a greater magnitude as the distance from the optic axis increases in both directions.

The curves 50 and 60 can always be expressed by some sort of equation in which the values of X and Y represent certain values which are obtained from an examination of the type of lens being employed. For example, a curve in the general form of:

$$Y = AX^3 + BX^2 + CX \quad (1)$$

can be used to obtain a curve such as 50 and 60 in FIG. 2, but where the values of A, B, and C are needed to determine whether the curve follows that shown by solid line 50 or follows that shown by dash line 60 or, as a matter of fact, any similar curve. Of course since curves 50 and 60 are symmetrical, the general equation (1) will have its even power coefficients such as B equal to 0.

The values of A, B, and C in the above equation are obtainable from information supplied with the lens and a calculation of how X and Y vary from the optic axis for that lens can then be made. The manufacturer of lenses can normally determine these variables at the time the lens is made and, according to one embodiment of the present invention, would encode the values of A, B, and C in some user-readable place such as onto the body of the lens itself so that the user would be able to determine what these values were for use in his system. More particularly, returning to FIG. 1, an inscribed value "123456" is shown on the body of lens 12 by reference numeral 70. The operator provides an input device 72 for example a keyboard, with this information and the input device 72 produces a signal in accordance with the encoded values on an output shown as arrow 74 which is presented to the microprocessor 36. Microprocessor 36 will be programmed to analyze the equation (1) above and to utilize the input to determine the value of A, B, and C obtained from the input 72 to correct the signals coming from the individual detectors 32 on the input 38 and accordingly derive a corrected output on line 40 truly representative of the size of the object 10 as derived from the image 20. The input device 72 may also receive an indication of the distance to the object so that the signal of lens 74 carries this information to the microprocessor also. The inherent system errors can be presented to the input device 72 so that the signal on line 74 carries this information. * Alternatively, the microprocessor 36 may also be encoded with any inherent system errors. In any event, microprocessor 36 will modify the output on line 40 to compensate for these errors also.

While equation (1) above has been utilized for describing the present invention, the equation may take many different forms, but in all cases will have certain values which are derivable from the lens that can be utilized to allow the microprocessor 36 to correct the signal. The curves 50 and 60 in FIG. 2 have also been shown merely for purposes of example and may take various other shapes but will always be describable by some equation which would be programmed into the microprocessor 36.

Figure 3:
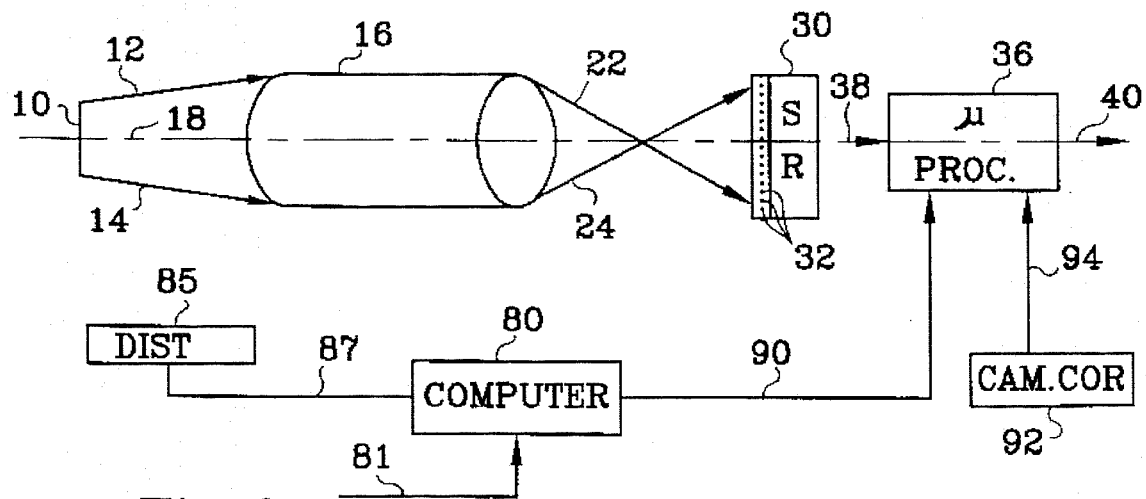
FIG. 3 is a schematic representation of a second embodiment of the present invention.

As mentioned above, the lens distortion has an effect on the output from the measurement system which varies with the distance to the remote object 10. Accordingly for a very accurate system, it is desirable to provide a compensation which varies with the distance to object 10. FIG. 3 is a schematic showing a preferred method of accomplishing this correction. In FIG. 3 which shows the system of FIG. 1 using the same reference numerals for all the same portions thereof but further includes a computer 80 having a first input 81 which may be a floppy disk input upon which the correction values representative of the lens distortion are placed. Thus instead of utilizing an operator supplied input 72 in FIG. 1, FIG. 3 utilizes a computer wherein the encoded values for the lens distortion are fed into computer 80 to provide the computer with information as to the lens distortion values.

FIG. 3 also shows a distance determining device 85 providing an output shown as arrow 87 to computer 80 which is indicative of the distance to the remote object 10. Device 85 may be a range determining apparatus such as shown by the Stauffer U.S. Pat. No. 4,002,899 or, if the operator knows the distance to object 10 or can measure it easily may manually input a signal which sets that distance so that the signal on the connection 87 supplies computer 80 with an input representative of the distance. Computer 80, therefore, will operate with the lens distortion values supplied in input 81 and modify these in accordance with the distance input supplied by the distance device 85 to produce a corrected value on a line 90 which is presented to the microprocessor 36 so to correct the value as measured by the detector. A further input to correct for any camera errors such as miscentering of the image may be supplied from a camera corrector input 92 by an output line 94 so that the final output on line 40 is truly correct.

While both a microprocessor and a computer have been shown in FIG. 3, they may be combined and their functions included in single computer if desired in which case the output therefrom be the final resulting corrected output.

It is therefore seen that I have provided a method and apparatus for correcting errors that are caused by distortions in lenses and for errors in the measurement system and errors caused by the different distances to the object when used in measuring systems. Many obvious changes will occur to those skilled in the art and I do not wish to be limited to the specific disclosures used in connection with the preferred embodiment.

What is claimed is:

1. Apparatus for use with lens means in which distortion occurs according to a generalized equation containing values which vary with the type of lens, said lens means carrying an indication of the values comprising:

detector means for receiving an image from the lens means and to produce an output containing errors produced by the distortion of the leans means;

computer means connected to receive the output of the detector means;

input means for producing an input indicative of the values carried by the lens means; and connection means connecting the input means to the computer means to supply the input thereto, the computer means operating to modify the output from the detector means in accordance with the values obtained from the input means to correct the error and produce a corrected resultant output.

2. Apparatus according to claim 1 wherein the detector means is a linear array of detectors.

3. Apparatus according to claim 2 wherein the output from the linear array or detector is presented to a shift register to produce a series of signals each representative of the output of the linear array or detectors.

4. Apparatus according to claim 3 wherein the computer modifies the series of signals in accordance with the values to produce the corrected resultant output.

5. Apparatus according to claim 4 wherein the computer also receives an input indicative of the distance to the object and modifies the series of signals in accordance therewith.

6. Apparatus according to claim 5 wherein the detectors of the linear array of detectors are CCD devices.

7. The method of correcting output errors from a radiation detector array caused by distortion in a lens means which directs radiation to the array comprising the steps of:

A. Encoding the lens means with indications of values related to the distortion in the lens means;

B. Providing a signal containing the values as determined from the encoded indications; and C. Modifying the output from the radiation detector array in accordance with the signal to correct the output errors.

8. The method of claim 7 including the step of:

A1. Supplying a signal from the detector array containing the output errors to a microcomputer.

9. The method of claim 8 including the step of:

B1. Supplying the microcomputer with the signal of step B.

10. The method of claim 9 including the step of:

C1. Programming the microcomputer to modify the signal of step A1 with the signal of step B1 to produce a resultant corrected signal.

11. The method of claim 10 wherein the programming of the microcomputer modifies the signal of step A1 according to the function of the equation $Y=Ax^3+Bx^2+Cx$ where x is the object position off axis and Y is the resultant image position signal and A, B and C are the values to the distortion.

12. Apparatus for correcting errors in measuring systems which include camera means for producing an output indicative of the characteristic of a remote object and which includes lens means that have inherent errors therein and which include detector means positioned to receive an image of a remote object through the lens means comprising:

computer means having a first input to receive values representative of the inherent errors;

distance inputting means operable to provide an output indicative of the distance to the object;

means connecting said distance inputting means to said computer means to supply the output as a second input to said computer means, said computer means operating to provide an output indicative of the inherent errors as modified by the distance to the remote object; and means connecting the computer means to the camera means to adjust the output thereof and correct for errors due to inherent lens errors.

13. Apparatus according to claim 12 wherein said computer means further includes an input for correcting for camera errors so as to modify its output accordingly.

14. Apparatus according to claim 13 wherein said computer means includes a microprocessor associated with said camera means into which the camera error is incorporated.

15. Apparatus for providing a corrected output signal from a camera having detector means and lens means therein, the lens means providing an image of a remote object on the detector means and the detector means producing a corresponding output signal which may contain errors resulting from A) inherent lens error that may vary with the distance to the object, and B) errors introduced by the camera such as non-centering of the image on the detector comprising:

computer means having an output, a first input to receive values indicative of the inherent lens errors and a second input;

distance means for supplying a signal indicative of the distance to the object;

means connecting the signal from the detector means to the second input so that the output is corrected for lens distortion errors as they vary with distance; and means connecting the output of the computer means to the camera means to modify the output signal thereof in accordance with the corrections produced by the computer means and provide a true camera output signal.

16. Apparatus according to claim 15 wherein the computer means also receives an input indicative of camera errors so that the output thereof further corrected.

17. Apparatus according to claim 16 including microprocessor means in which the camera errors are stored.

18. Apparatus according to claim 17 wherein the computer means includes the microprocessor having the camera positioning errors.

19. Apparatus according to claim 15 wherein the signal indicative of distance is supplied by an automatic range measuring device.

20. Apparatus according to claim 15 wherein the signal indicative of distance to the remote object is a signal supplied by the operator.

21. Apparatus according to claim 15 wherein the first input of the computer is a disk having values indicative of the distortion errors encoded thereon.

* * * * *